(12) United States Patent
Williams et al.

(10) Patent No.: US 11,613,225 B2
(45) Date of Patent: Mar. 28, 2023

(54) AIRBAG DEVICE

(71) Applicant: AUTOLIV ASP, INC., Ogden, UT (US)

(72) Inventors: Jeffrey Daniel Williams, Roy, UT (US); Changsoo Choi, Rochester, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 17/153,571

(22) Filed: Jan. 20, 2021

(65) Prior Publication Data
US 2022/0227324 A1   Jul. 21, 2022

(51) Int. Cl.
*B60R 21/2338*   (2011.01)
*B60R 21/231*   (2011.01)
*B60R 21/205*   (2011.01)
*B60R 21/02*   (2006.01)
*B60R 21/16*   (2006.01)
*B60R 21/233*   (2006.01)

(52) U.S. Cl.
CPC .......... *B60R 21/205* (2013.01); *B60R 21/231* (2013.01); *B60R 21/2338* (2013.01); *B60R 2021/024* (2013.01); *B60R 2021/161* (2013.01); *B60R 2021/23308* (2013.01); *B60R 2021/23316* (2013.01); *B60R 2021/23382* (2013.01)

(58) Field of Classification Search
CPC . B60R 21/2338; B60R 21/205; B60R 21/231; B60R 2021/23382; B60R 2021/024; B60R 2021/161; B60R 2021/0009; B60R 2021/0048; B60R 2021/0004; B60R 2021/0044

USPC ............................................. 280/743.2, 743.1
See application file for complete search history.

(56) References Cited

U.S. PATENT DOCUMENTS

| | | | | |
|---|---|---|---|---|
| 10,654,439 | B2 * | 5/2020 | Kitagawa | B60R 21/2334 |
| 2018/0126946 | A1 * | 5/2018 | Bausch | B60R 21/2338 |
| 2019/0291681 | A1 * | 9/2019 | Nakajima | B60R 21/231 |
| 2020/0010044 | A1 * | 1/2020 | Yamada | B60R 21/23138 |
| 2020/0023804 | A1 * | 1/2020 | Weiss | B60R 21/231 |
| 2020/0031306 | A1 * | 1/2020 | Nakajima | B60R 21/233 |
| 2020/0086821 | A1 * | 3/2020 | Nakajima | B60R 21/205 |
| 2020/0180547 | A1 * | 6/2020 | Ohara | B60R 21/23138 |
| 2022/0126778 | A1 * | 4/2022 | Habu | B60R 21/205 |

FOREIGN PATENT DOCUMENTS

WO   WO-2020174892 A1 *   9/2020   ........... B60R 21/205

* cited by examiner

*Primary Examiner* — Keith J Frisby
(74) *Attorney, Agent, or Firm* — Dickinson Wright PLLC

(57) ABSTRACT

An airbag device is adapted to be installed in a vehicle for protecting an occupant. The airbag device includes a bag-like cushion that inflates and deploys in front of a seat and is adapted to restrain the occupant. In an inflated condition, the airbag cushion includes a main inflating section inflating toward the rear of the vehicle, a pair of lobes protruding toward the rear of the vehicle on both sides of the main inflating section in a vehicle width direction, a pair of secondary inflating sections being provided respectively between the main inflating section and each of the lobes in the vehicle width direction and inflating toward the rear of the vehicle, and a pair of tethers are symmetrically attached and tensioned inside the cushion for preventing the protruded lobes from swinging around the main inflating section of the cushion.

17 Claims, 5 Drawing Sheets

AIRBAG DEVICE

TECHNICAL FIELD

This present disclosure relates to an occupant protection device installed in a vehicle. In particular, the present disclosure relates to an airbag device including a bag-like cushion that inflates and deploys in front of a seat.

BACKGROUND

The statements in this section merely provide background information related to the present disclosure and may not constitute prior art.

Airbag devices including front airbags, curtain airbags, and side airbags as a safety restraint device are mandatory in motor vehicles sold throughout the world. In the event of a vehicle impact or rollover event, inflators coupled with each airbag are triggered and deploy the airbags respectively according to the impact direction of the vehicle. In particular, in order to protect occupants of front seats from mainly impact in a front of the vehicle, a driver's seat is provided with a front airbag at a center of a steering wheel while a passenger airbag is provided in a vicinity of a passenger seat inside an instrument panel or in a neighboring region thereof. In addition, in order to protect respective occupants of front and back row seats from a side collision or from a subsequently occurring rollover, a curtain airbag which inflates and deploys along a side window is provided in a vicinity of a roof rail of the vehicle and a side airbag which inflates and deploys to an immediate side of an occupant is provided in a side part of a seat.

Airbag cushions of various airbag devices may be created in a shape conforming to a portion of the body of an occupant so that the occupant can be restrained in an efficient manner. For example, in a front airbag cushion for a passenger, both sides of the front airbag cushion extend further than a middle portion of the airbag cushion for protecting the head of the occupant such that the head of the occupant can be covered and protected by the extended sides of the front airbag cushion.

In addition, modern airbags are required to be capable of accommodating oblique collisions in which impact forces act on a vehicle from an obliquely fore/aft direction. In an oblique collision, an occupant enters an airbag cushion positioned in front of a seat at an angle along an oblique direction. In such cases, when the head of the occupant comes into contact with the airbag cushion in front of the seat, a rotation around the neck when viewed from above may occur on the head. Since such a rotation of the head is likely to become a factor that increases an injury value of the occupant from the perspective of the structure of the human body, there is a demand for preventing such rotations in an efficient manner.

As described above, some front airbag designs feature extended sides which help to support the head of an occupant when the head is moved in the front or oblique direction of the vehicle in a collision. However, there is a risk that shapes of the extended sides from the front airbag cushion cannot be retained when restraining the head of the occupant during the collisions.

SUMMARY

The present disclosure relates to an airbag device being adapted to be installed in a vehicle for protecting an occupant. The airbag device includes a bag-like cushion that inflates and deploys in front of a seat, and is adapted to restrain the occupant. In an inflated condition of the airbag cushion, the cushion includes a main inflating section inflating toward the rear of the vehicle, a pair of lobes protruding toward the rear of the vehicle on both sides of the main inflating section in a vehicle width direction, a pair of secondary inflating sections being provided respectively between the main inflating section and each of the lobes in the vehicle width direction and inflating toward the rear of the vehicle, and a pair of internal tethers each having a first end attached to a side surface inside the cushion in the vehicle width direction and a second end attached to an inner surface of the secondary inflating section.

In the present disclosure, the pair of internal tethers symmetrically attached inside cushion are adapted to prevent the protruded lobes from swinging around the main inflating section. During a deployment of the cushion, accordingly, the tethers are tensioned and the tensioned tethers stiffen the secondary inflating sections arranged between the main inflating section and each of the lobes so that the stiffened secondary inflating section is adapted to prevent a lobe clap of the protruded lobes.

In accordance with a further aspect of the present disclosure, each of the pair of tethers is formed from a single piece of fabric, which is folded such that the folded tether has a folded side and an open side. In addition, the folded tether is provided with an inner layer and an outer layer such that the folded tether is tensioned to form a Y-shape in the inflated condition of the cushion. At the second end of the tether, the inner layer is connected to a first boundary between the main inflating section and the secondary inflating section and the outer layer is connected to a second boundary between the secondary inflating section and the protruded lobe.

In accordance with a further aspect of the present disclosure, the folded side of the fabric of the tether is provided at the second end of the tether such that a folded surface is formed between the inner and outer layers at the folded side of the tether and entirely affixed to the inner surface of the secondary inflating section. A folded surface width of the tether is generally equal to a width of the secondary inflating section in the vehicle width direction.

In accordance with another aspect of the present disclosure, the open side of the fabric of the tether is provided at the second end of the tether such that at the open side of the tether, each edge surface of the inner and outer layers is formed and affixed to the inner surface of the secondary inflating section.

In accordance with a further aspect of the present disclosure, each tether has a first vertical dimension at the first end and a second vertical dimension at the second end, and the second vertical dimension is greater than the first vertical dimension in the inflated condition of the cushion.

In accordance with a further aspect of the present disclosure, each of the lobes protrudes further toward the rear of the vehicle than rear end surfaces of the main and secondary inflating sections. Each of the secondary inflating sections convexly inflates toward the rear of the vehicle within a smaller expansion range in the vehicle width direction than an expansion range of the main inflating section and an expansion range of the protruded lobes in the vehicle width direction. In addition, a curvature radius of the secondary inflating section is smaller than a curvature radius of the main inflating section and a curvature radius of the lobe in the inflated condition of the cushion.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1A:
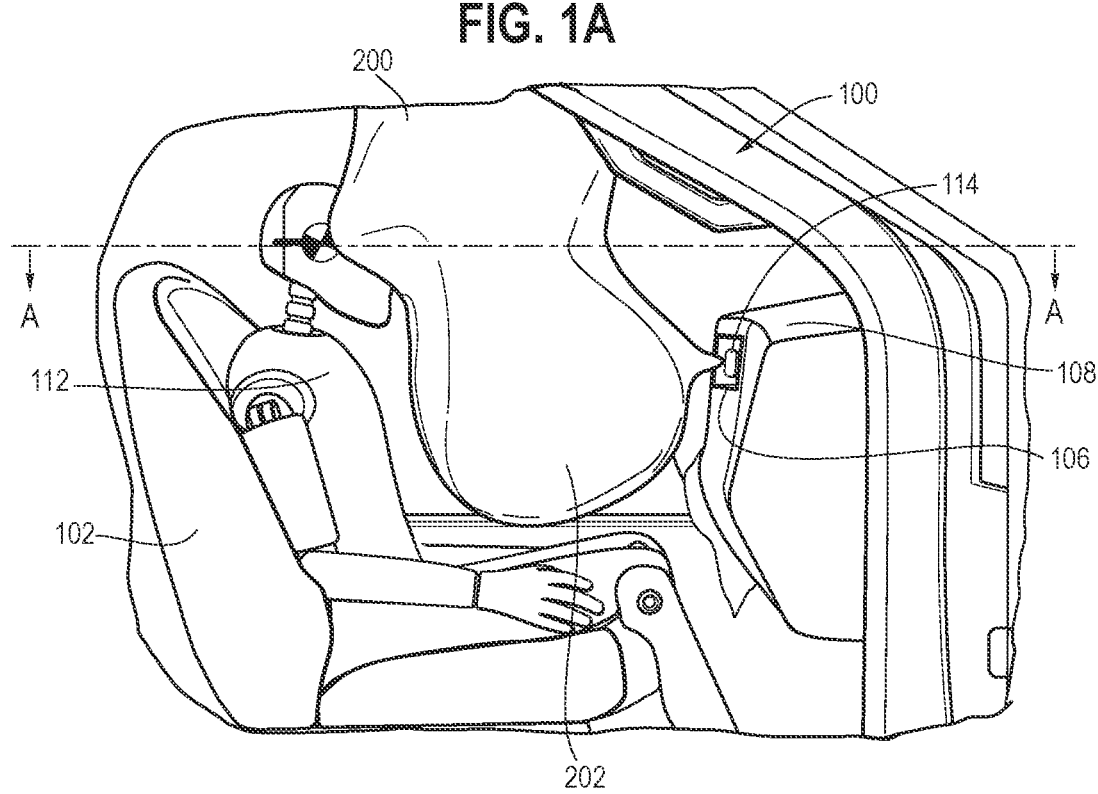
FIG. 1A illustrates an airbag cushion as viewed from the vehicle outer side in accordance with an embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1B:
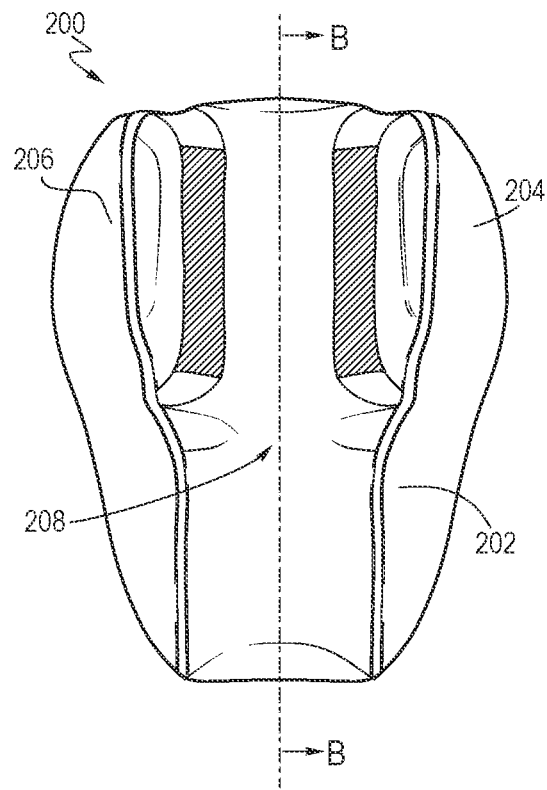
FIG. 1B illustrates the airbag cushion as viewed from the rear of the vehicle.
Figure 1C:
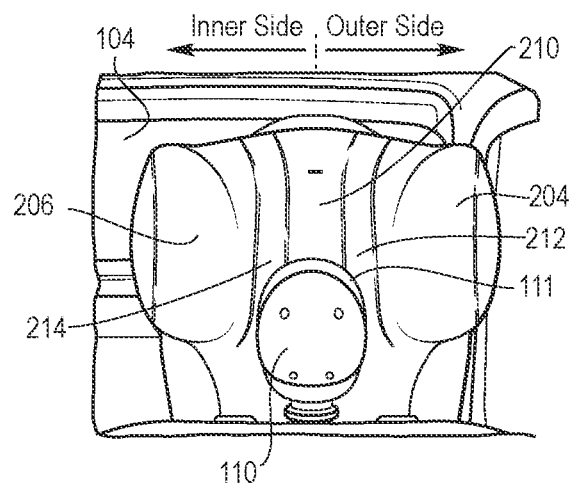
FIG. 1C shows a detailed view of the airbag cushion of FIG. 1B.

Referring to FIGS. 1A-1C, an airbag device 100 is illustrated according to an embodiment of the present invention. In FIGS. 1A, 1B, and 1C, the airbag device 100 is implemented as a passenger airbag for restraining an occupant who is sitting on a front passenger seat 102 in a vehicle, which is on a right-side seat 102 in a left-hand drive vehicle). Hereinafter, accordingly, a vehicle outer side in a vehicle width direction means the right side of the vehicle and a vehicle inner side in the vehicle width direction means the left side of the vehicle.

As shown in FIGS. 1A-1C, a cushion 200 of the airbag device 100 is stored in a storage part 106 provided in an instrument panel 108. (See also FIG. 2A). The storage part 106 is installed toward the front of the vehicle with respect to the seat 102 and also stores an inflator 114 which is a gas generating device in addition to the airbag cushion 200. The airbag cushion 200 is normally stored in the storage part 106, and inflates and deploys in front of the seat 102. The airbag cushion 200 has a bag shape and is formed by laying a plurality of base fabric pieces or blanks constituting a surface thereof one on top of another and sewing, bonding, or spinning and weaving the plurality of base fabric using one-piece woven.

FIG. 1A illustrates the airbag cushion 200 as viewed from the vehicle outer side and FIG. 1B illustrates the airbag cushion 200 as viewed from the rear of the vehicle. The airbag cushion 200 includes a main body portion 202 and a pair of lobes 204 and 206 provided on a vehicle rearward side of the main body portion 202. From the storage part 106 (see FIG. 2), the main body portion 202 of the airbag cushion 200 inflates and deploys toward the rear of the vehicle so as to fill a space between an upper surface of the instrument panel 108 and a windshield 104 of the vehicle. As shown in FIGS. 1A and 1B, the main body portion 202 occupies a large portion of the airbag cushion 200. A portion of the main body portion 202 on the vehicle rearward side has a forward inflating section 208 which restrains the head 110 of the occupant 112 (represented in the form of an anthropomorphic test dummy (ATD)) from the front of the vehicle. The pair of lobes 204 and 206 are provided on a slightly upper side in the rear of the vehicle with respect to the main body portion 202 of the airbag cushion 200 and protrude from the main body portion 202. In addition, the lobes 204 and 206 are provided on both sides of the forward inflating section 208 in the vehicle width direction, and inflate so as to protrude further toward the rear of the vehicle than the forward inflating section 208 to mainly restrain the head 110 of the occupant 112 including a temporal region 111.

FIG. 1C shows a detailed view from the rear of the vehicle. As shown in FIG. 1C, the forward inflating section 208 of the airbag cushion 200 disposed between the pair of lobes 204 and 206 includes a main inflating section 210 and a pair of secondary inflating sections 212 and 214. The secondary inflating sections 212 and 214 are each provided on both sides of the main inflating section 210 in the vehicle width direction such that each of the secondary inflating sections 212 and 214 is arranged between the main inflating section 210 and each of the lobes 204 and 206.

Figure 2A:
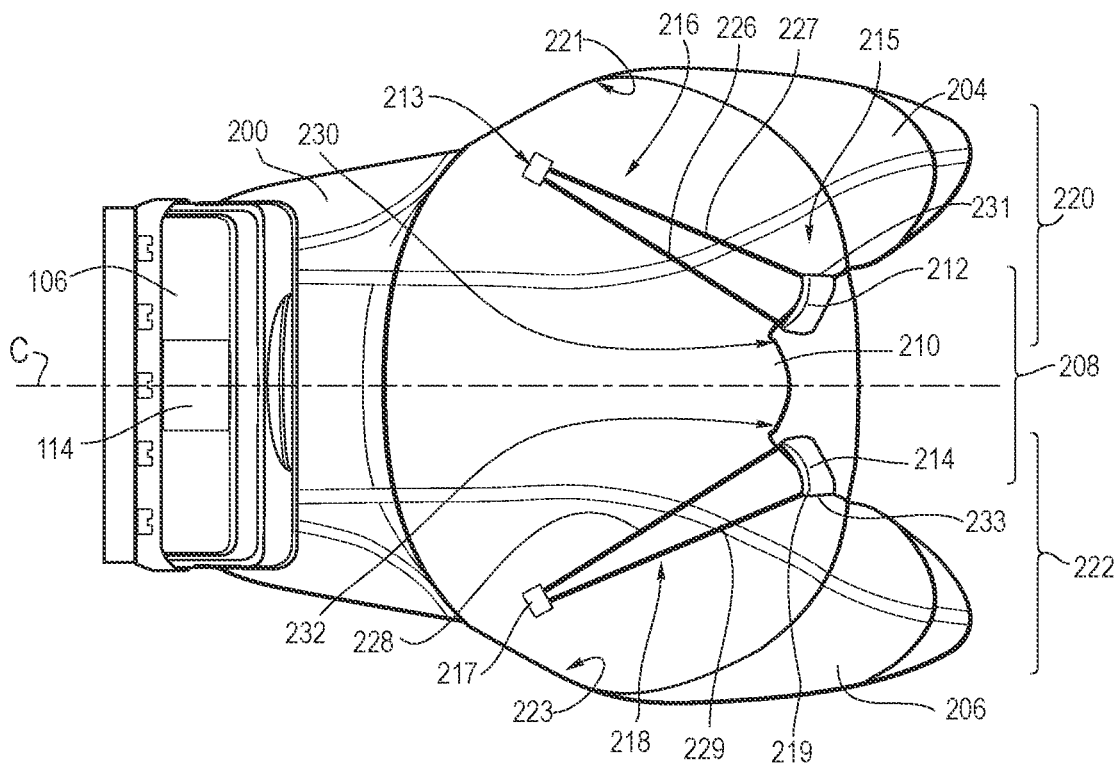
FIG. 2A is an A-A sectional view of the airbag cushion of FIG. 1A.

FIG. 2A is an A-A sectional view of the airbag cushion 200 shown in FIG. 1A. As shown in FIG. 2A, a part of the inflator 114 is inserted into the airbag cushion 200 for supplying gas to the airbag cushion 200, which inflates and deploys toward the seat 102, and restrains the occupant 112 from the front of the vehicle. Generally, the inflator 114 is fixed to a rigid portion of the vehicle such as a cross beam inside the storage part 106 (see FIG. 1A).

As shown in FIG. 2A, a pair of internal tethers 216 and 218 are provided inside the airbag cushion 200. A first tether 216 is arranged on the outer side 220 of the vehicle and a second tether 218 is arranged on the inner side 222 of the vehicle. Since the first tether 216 and the second tether 218 are identical and symmetrically provided inside the airbag cushion 200, the feature of the first tether 216 will be described hereinafter.

In FIG. 2A, the first tether 216 includes a first end 213 for attaching to an inner surface 221 on the outer side 220 of the airbag cushion 200 and a second end 215 for attaching to an inner surface of the secondary inflating section 212. Like the first tether 216, the second tether 218 also includes a first end 217 for attaching to an inner surface 223 on the inner side 222 of the airbag cushion 200 and a second end 219 for attaching to an inner surface of the secondary inflating section 214. Both tethers 216 and 218 are each connected to each of the secondary inflating sections 212 and 214 inside the airbag cushion 200, and as the airbag cushion 200 inflates and deploys, both tethers 216 and 218 are tensioned so as to pull the forward inflating section 208 including the main inflating section 210 and the secondary inflating sections 212 and 214.

As shown in FIG. 2A, the tethers 216 and 218 each include inner layers 226 and 228 which are close to a center line C of the airbag cushion 200 along a vehicle longitudinal direction and outer layers 227 and 229 which are close to the protruded lobes 204 and 206. In FIG. 2A, the first and second tethers 216 and 218 are each formed with a single fabric piece 224, which is folded to form the first end 213 and 217 and the second end 215 and 219 respectively for affixing to the inner surfaces inside the airbag cushion 200 (see FIG. 3A). According to other embodiments of the present disclosure, the tether may be formed with at least two separate fabric pieces which having a plurality of layers for attaching and tensioning the airbag cushion 200. The outer layers 227 and 229 are each connected to portions closer to the protruded lobes 204 and 206 than the inner layers 226 and 228, which are connected to portions at a prescribed distance from the outer layers 227 and 229 toward the center line C of the airbag cushion 200 along the vehicle longitudinal direction. For example, the distance between the inner layer 226 and 228 and the outer layer 227 and 229 at the second end 215 and 219 of the tethers 216 and 218 in the vehicle width direction is generally equal to the width distance of the secondary inflating sections 212 and 214.

Figure 2B:
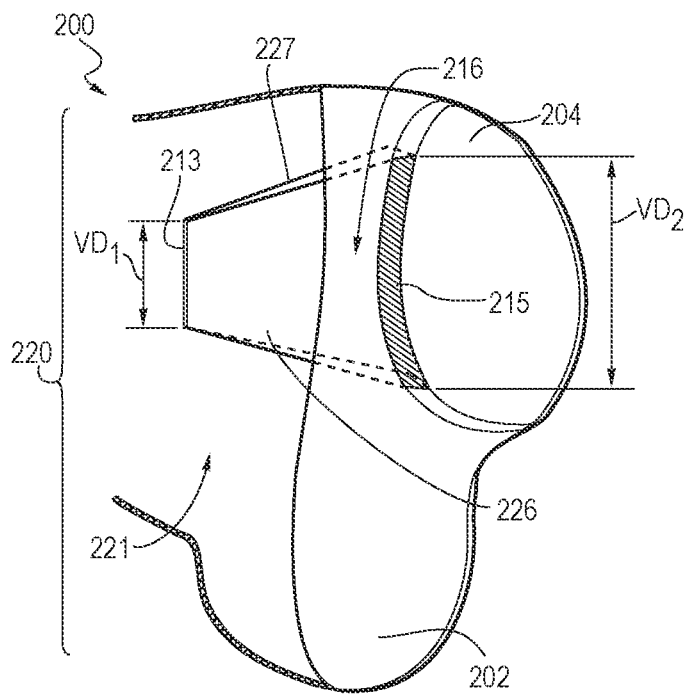
FIG. 2B is a B-B sectional view of the airbag cushion of FIG. 1B.

FIG. 2B is a B-B sectional view of the airbag cushion 200 of FIG. 1B. FIG. 2B shows the inner and outer layers 226 and 227 of the first tether 216. The inner and outer layers 226 and 227 of the first tether 216 are formed with an identical shape that gradually spreads from the first end 213 of the first tether 216 toward the second end 215. As shown in FIGS. 2A and 2B, at the second end 215, the inner and outer layers 226 and 227 are affixed to the forward inflating section 208 and at the first end 213, the inner and outer layers 226 and 227 are affixed to the inner surface 221 of the outer side 220 of the airbag cushion 200. In a similar manner, the inner and outer layers 228 and 229 of the second tether 218 are an identical shape that gradually spreads from the first end 217 of the second tether 218 toward the second end 219 of the second tether 218. In addition, at the second end 219, the second inner and outer layers 228 and 229 are affixed to the forward inflating section 208 and at the first end 217, the inner and outer layers 228 and 229 are also affixed to the inner surface 223 of the inner side 222 of the airbag cushion 200. Accordingly, as the airbag cushion 200 inflates and deploys, the inner and outer layers 226, 227, 228, and 229 of the first and second tethers 216 and 218 can efficiently pull the forward inflating section 208 toward the front of the vehicle to be convexly tensioned.

As shown in FIGS. 1B and 2A, the forward inflating section 208 is formed with the main inflating section 210 and the secondary inflating sections 212 and 214 by the inner layers 226 and 228 and the outer layers 227 and 229 of the first and second tethers 216 and 218, which are attached and tensioned inside the cushion 200. The main inflating section 210 inflates so as to convexly curve and face toward the occupant 112 on the center side in the vehicle width direction (see FIG. 1C). The secondary inflating sections 212 and 214 also inflate so as to convexly curve and face toward the occupant 112 between the main inflating section 210 and the protruded lobes 204 and 206 respectively.

As shown in FIGS. 1A and 2A, the airbag cushion 200 is stored in the storage part 106 of the instrument panel 108 before being deployed. When an impact occurs on the vehicle, as shown in FIG. 1, an operational signal is transmitted to the airbag device 100 from a sensor (not shown) and the airbag cushion 200 inflates and deploys toward the occupant 112 who is sitting on the front seat of the vehicle. As shown in FIG. 2A, when the airbag cushion 200 inflates and deploys, at the second ends 215 and 219, the inner layers 226 and 228 are each connected to a portion constituting inner boundaries 230 and 232 between the main inflating section 208 and each of the secondary inflating sections 212 and 214, and the outer layers 227 and 229 are each connected to a portion constituting outer boundaries 231 and 233 between each of the secondary inflating sections 212 and 214 and each of the protruded lobes 204 and 206. Accordingly, as shown in FIG. 2A, as the inner layers 226 and 228 and the outer layers 227 and 229 of the first and second tethers 216 and 218 are tensioned with the expansion and deployment of the airbag cushion 200 and pull the respective portions of the forward inflating section 208 toward the front of the vehicle, the main inflating section 210 and the secondary inflating sections 212 and 214 convexly inflate toward the rear of the vehicle for restraining the occupant 112. In addition, the tethers 216 and 218 having the inner and outer layers 226, 227, 228, and 229 are tensioned to form a Y-shape in an inflated condition of the airbag cushion 200 (see FIGS. 3 and 4).

Referring back to FIGS. 1A and 1C, the airbag cushion 200 inflates toward the rear from the front of the vehicle with respect to the occupant 112 so as to restrain the head 110 of the occupant with the main body portion 202 including the forward inflating section 208. During an oblique collision, however, the occupant 112 may move toward the front of the vehicle and also move obliquely forward on the vehicle inner side or the vehicle outer side. For restraining the occupant in the oblique collision, as shown in FIGS. 1C and 2A, the lobes 204 and 206 are provided so as to protrude to the vehicle rearward side from both sides of the forward inflating section 208 in the vehicle width direction.

Figure 5:
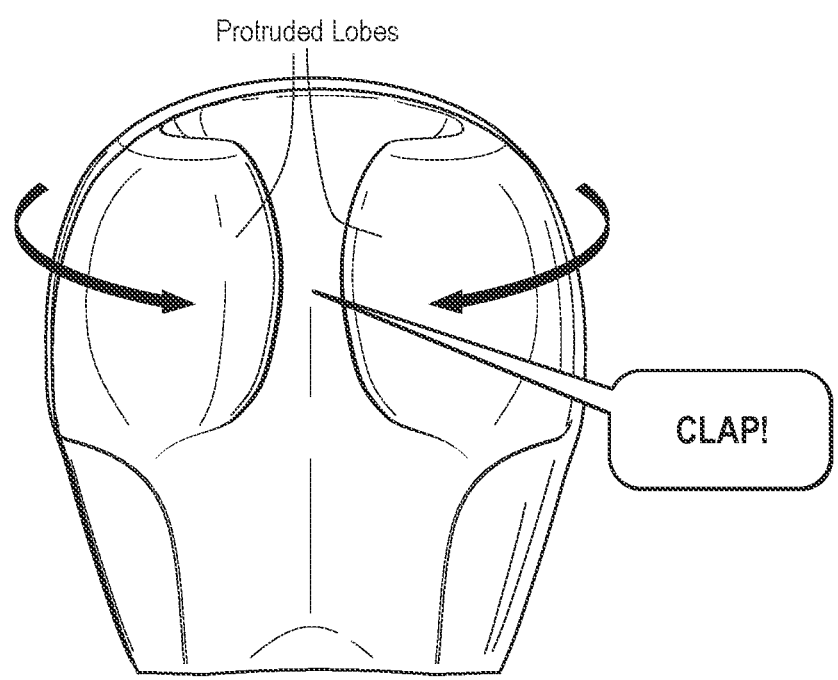
FIG. 5 shows a lobe clap occurrence of the protruded lobes swinging around a main inflating section during a deployment of an airbag cushion as a prior art.

As shown in FIGS. 1C and 2A, due to the attached and tensioned tethers 216 and 218 inside the airbag cushion 200, the protruded lobes 204 and 206 in both sides of the forward inflating section 208 in the vehicle width direction are stiffened to restrain the head 110 and the temporal region 111 of the occupant 112 by reducing the risk of the skew and twist of the airbag cushion 200. In particular, the tensioned tethers 216 and 218 are affixed to the secondary inflating sections 212 and 214, which are each convexly curved between the main inflating section 210 and each of the protruded lobes 204 and 206. As shown in FIGS. 1B and 1C, the secondary inflating sections 212 and 214 are convexly tensioned and stiffened for supporting the protruded lobes 204 and 206 without being squashed between the main inflating section 208 and the lobes 204 and 206. Accordingly, the stiffened secondary inflating sections 212 and 214 by tensioned tethers 216 and 218 inside the airbag cushion 200 reduce or eliminate the risk of the lobe clap during a deployment of the cushion 200 (see FIG. 5). In a conventional airbag cushion having protruded lobes, as shown in FIG. 5, during the deployment of the airbag cushion, the protruded lobes can be swung around the forward inflating section, which is called as the lobe clap. In the present disclosure, however, the secondary inflating sections 212 and 214 arranged respectively between the main inflating section 210 and each of the protruded lobes 204 and 206 are configured to reduce the risk of the lobe clap during the deployment of the airbag cushion 200.

In the present disclosure, the tensioned tethers 216 and 218 improve the stiffness of the protruded lobes 204 and 206 and reduce the bending or buckling of the protruded lobes 204 and 206 for restraining the head 110 of the occupant 112 during the deployment of the airbag cushion 200. In addition, due to the tensioned tethers 216 and 218 in the inflated condition of the cushion 200, the width of the airbag cushion 200 becomes narrower in the vehicle width direction to allow more clearance for the curtain airbag to deploy simultaneously in the oblique collision. Accordingly, the configuration of the airbag cushion 200 in the present disclosure reduces the interference risk between the front airbag cushion 200 and the side curtain airbag (not shown) during the deployment.

Figure 2C:
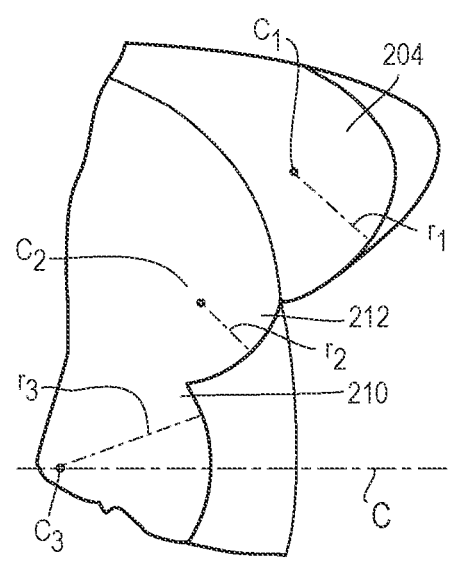
FIG. 2C is an enlarged view of a vicinity of a main inflating section, a secondary inflating section, and a protruded lobe shown in FIG. 2A.

Referring back to FIG. 2A, the secondary inflating sections 212 and 214 arranged in both sides of the main inflating section 210 in the vehicle width direction inflate within a smaller expansion range than the expansion range of the main inflating section 210 and the protruded lobes 204 and 206 respectively. FIG. 2C is an enlarged view of a vicinity of the protruded lobe 204, the secondary inflating section 212, and the main inflating section 210 of FIG. 2A. In FIG. 2C, a first circle having a center C1 along a curvature of the protruded lobe 204, a second circle having a center C2 along a curvature of the secondary inflating section 212, and a third circle having a center C3 along a curvature of the main inflating section 210 are defined. In addition, a curvature radius r2 of the second circle defined in the secondary inflating section 212 is smaller than a curvature radius r1 of the first circle defined in the protruded lobe 204 and a curvature radius r3 of the third circle defined in the main inflating section 210.

Referring back to FIG. 2B, the first tether 216 has a vertical dimension sufficient to cover a vertical range of the protruded lobes 204 and 206. As shown in FIG. 2B, the vertical dimensions at the first end 213 and the second end 215 of the first tether 216 are different from each other. The vertical dimension VD1 on the first end 213 of the first tether 216 is smaller than the vertical dimension VD2 on the second end 215 of the first tether 216. For example, when the airbag cushion 200 is deployed, the length of the vertical dimension VD2 at the second ends 215 and 219 is greater than the length of the vertical dimension VD1 at the first ends 213 and 217 (see also FIGS. 3B and 4B).

Figure 3:
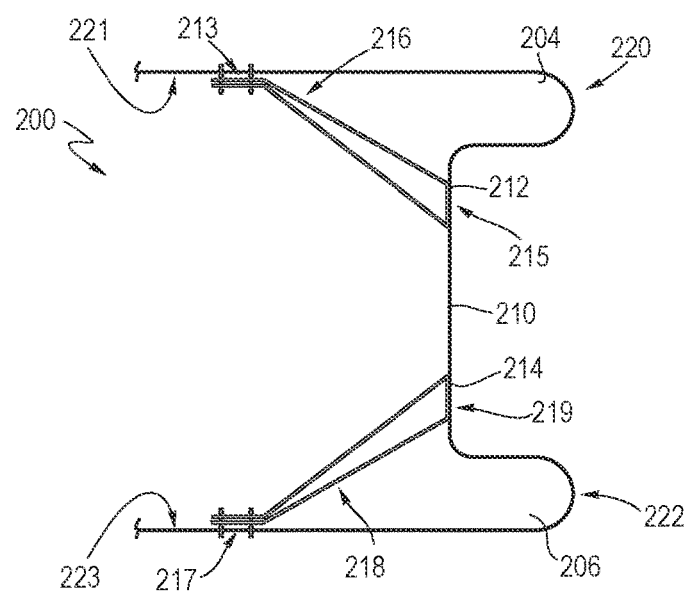
FIG. 3 is a diagram illustrating an A-A sectional view of an airbag cushion of FIG. 1A in accordance with an embodiment of the present disclosure.
Figure 3A:
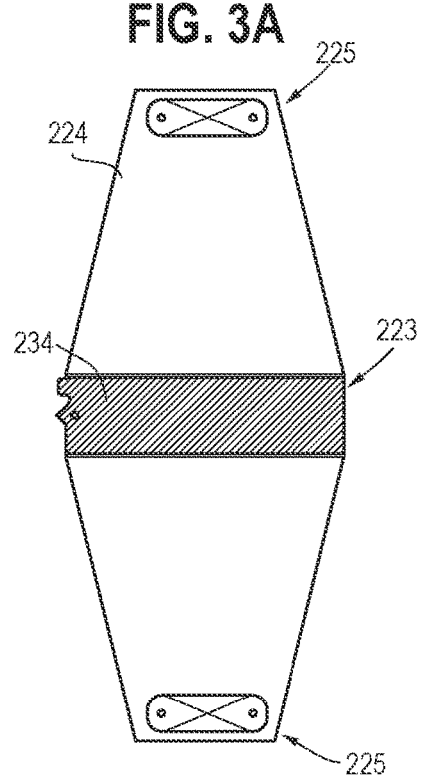
FIG. 3A shows a tether having a single fabric inside the airbag cushion of FIG. 3.
Figure 3B:
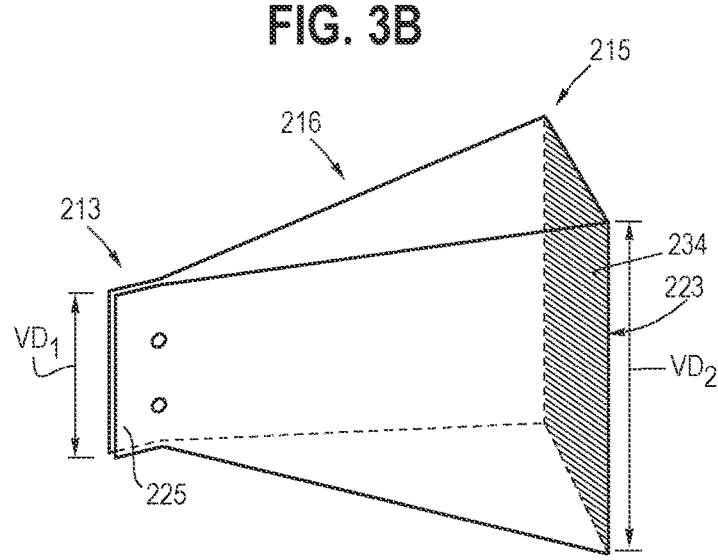
FIG. 3B shows the folded fabric of the tether of FIG. 3A as viewed from the vehicle inner side.

FIGS. 3-3B show a simplified diagram of the airbag cushion 200 having the pair of tethers 216 and 218 according to a first embodiment of the present disclosure. As shown in FIG. 3, each of the tethers 216 and 218 is formed with the single fabric 224, which is folded and affixed to the inner surface inside the airbag cushion 200 such that the single fabric 224 of the first and second tethers 216 and 218 has a folded side 223 and an open side 225. In the first embodiment of the present disclosure, the folded side 223 of the single fabric 224 is formed as the second ends 215 and 219 of each tether 216 and 218 and affixed to each of the secondary inflating sections 212 and 214 of the airbag cushion 200, and the open side 225 of the single fabric 224 is formed as the first ends 213 and 217 in each tether 216 and 218 and affixed to the inner surfaces 221 and 223 of the outer and inner sides 220 and 222 of the airbag cushion 200. In addition, as shown in FIGS. 3A-3B, the folded side 223 of the first and second tethers 216 and 218 is provided with a folded surface 234, which is entirely (a shaded area) affixed to the secondary inflating sections 212 and 214 to stiffen the secondary inflating sections 212 and 214 in the inflated condition of the cushion 200. In the first embodiment of the present disclosure, accordingly, the stiffened secondary inflating sections 212 and 214 arranged in both sides of the main inflating section 210 in the vehicle width direction prevent the protruded lobes 204 and 206 from swinging around the main inflating section 210.

Figure 4:
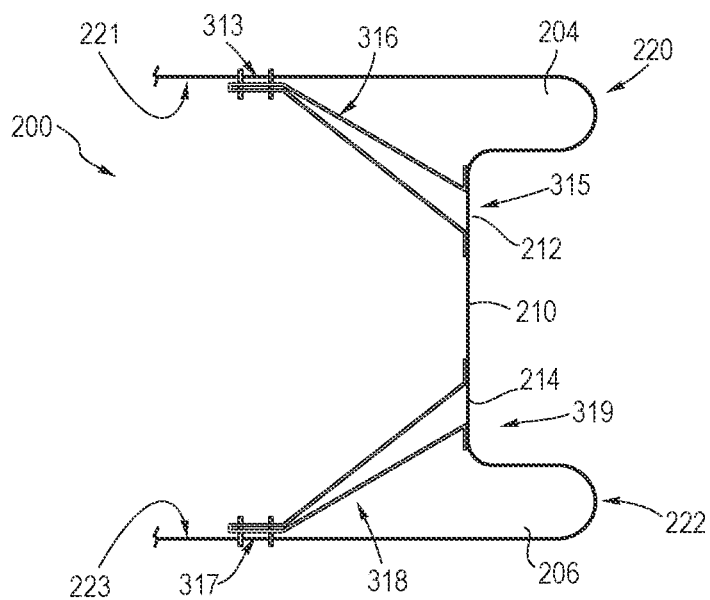
FIG. 4 is a diagram illustrating an A-A sectional view of an airbag cushion of FIG. 1A in accordance with another embodiment of the present disclosure.
Figure 4A:
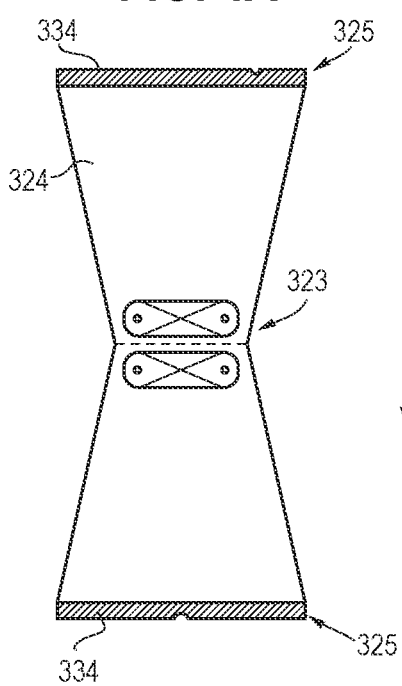
FIG. 4A shows a tether having a single fabric inside the airbag cushion of FIG. 4.
Figure 4B:
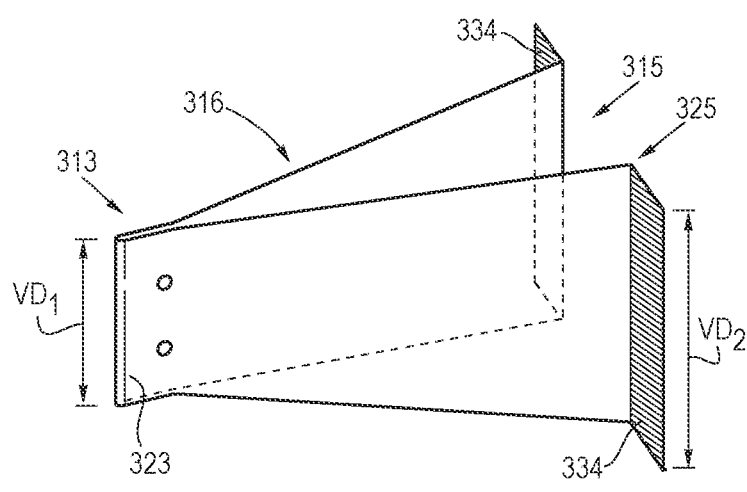
FIG. 4B shows the folded fabric of the tether of FIG. 4A as viewed from the vehicle inner side.

FIGS. 4-4B show a simplified diagram of the airbag cushion 200 having the pair of tethers 316 and 318 according to a second embodiment of the present disclosure. As shown in FIG. 4, each of the tethers 316 and 318 is formed with the single fabric 324, which is folded and affixed to the inner surface inside the airbag cushion 200 such that the single fabric 324 of the first and second tethers 316 and 318 has a folded side 323 and an open side 325. In the second embodiment of the present disclosure, the folded side 323 of the single fabric 324 is formed as a first end 313 and 317 in each tether 316 and 318 and affixed to the inner surface 221 and 223 of the outer and inner sides 220 and 222 of the airbag cushion 200, and the open side 325 of the single fabric 324 is formed as the second ends 315 and 319 in each tether 316 and 318 and affixed to each of the secondary inflating sections 212 and 214 of the airbag cushion 200. In addition, as shown in FIG. 4B, the open side 325 of the first and second tethers 316 and 318 is provided with edge surfaces 334, which are entirely (shaded areas) affixed to the secondary inflating sections 212 and 214 to stiffen the secondary inflating sections 212 and 214. Accordingly, the stiffened secondary inflating sections 212 and 214 arranged in both sides of the main inflating section 210 in the vehicle width direction prevent the protruded lobes 204 and 206 from swinging around the main inflating section 210.

The present invention can be used in an airbag device which is installed in a vehicle and which includes a bag-like cushion that inflates and deploys in front of a seat for restraining an occupant.

While the above description constitutes the preferred embodiments of the present invention, it will be appreciated that the invention is susceptible to modification, variation and change without departing from the proper scope and fair meaning of the accompanying claims.

What is claimed is:

1. An airbag device being adapted to be installed in a vehicle for protecting an occupant, including an airbag cushion that inflates and deploys in front of a seat, and being adapted to restrain the occupant, the airbag cushion comprising in an inflated condition:

a main inflating section inflating toward the rear of the vehicle;

a pair of lobes protruding toward the rear of the vehicle on both sides of the main inflating section in a vehicle width direction;

a pair of secondary inflating sections being provided respectively between the main inflating section and each of the lobes in the vehicle width direction and inflating toward the rear of the vehicle; and a pair of tethers each having a first end directly attached to an inner side surface of the airbag cushion in the vehicle width direction and a second end attached to an inner surface of the secondary inflating section, and being adapted to inhibit the protruded lobes from swinging around the main inflating section, wherein each of the pair of tethers is formed with a single fabric piece, which is folded such that the folded tether is provided with an inner layer and an outer layer.

2. The airbag device of claim 1, wherein the folded tether has a folded side and an open side such that the folded tether is tensioned to form a Y-shape in the inflated condition of the airbag cushion.

3. The airbag device of claim 2, wherein at the second end of the tether, the inner layer is connected to a first boundary between the main inflating section and the secondary inflating section, and the outer layer is connected to a second boundary between the secondary inflating section and the protruded lobe.

4. The airbag device of claim 2, wherein the folded side of the fabric of the tether is provided at the second end of the tether such that a folded surface is formed between the inner layer and the outer layer at the folded side of the tether and is entirely affixed to the inner surface of the secondary inflating section.

5. The airbag device of claim 4, wherein a folded surface width of the tether in the vehicle width direction is generally equal to a width of the secondary inflating section.

6. The airbag device of claim 2, wherein the open side of the fabric of the tether is provided at the second end of the tether such that, at the open side of the tether, each edge surface of the inner layer and the outer layer is formed and affixed to the inner surface of the secondary inflating section.

7. The airbag device of claim 1, wherein each tether has a first vertical dimension at the first end and a second vertical dimension at the second end, and the second vertical dimension is greater than the first vertical dimension in the inflated condition of the airbag cushion.

8. The airbag device of claim 1, wherein each of the lobes protrudes further toward the rear of the vehicle than rear end surfaces of the main and secondary inflating sections.

9. The airbag device of claim 1, wherein each of the secondary inflating sections convexly inflates toward the rear of the vehicle within a smaller expansion range in the vehicle width direction than an expansion range of the main inflating section and an expansion range of each of the lobes in the vehicle width direction.

10. The airbag device of claim 1, wherein a curvature radius of the secondary inflating section is smaller than a curvature radius of the main inflating section and a curvature radius of the lobe in the inflated condition of the airbag cushion.

11. The airbag device of claim 1, wherein the tethers are tensioned during a deployment of the airbag cushion so that the tensioned tethers stiffen the secondary inflating sections arranged between the main inflating section and each of the lobes for inhibiting a lobe clap of the protruded lobes.

12. An airbag device being adapted to be installed in a vehicle for protecting an occupant, including an airbag cushion that inflates and deploys in front of a seat, and being adapted to restrain the occupant, the airbag cushion comprising in an inflated condition:
 a main inflating section inflating toward the rear of the vehicle;
 a pair of lobes protruding toward the rear of the vehicle on both sides of the main inflating section in a vehicle width direction;
 a pair of secondary inflating sections being provided respectively between the main inflating section and each of the lobes in the vehicle width direction and inflating toward the rear of the vehicle; and
 a pair of tethers each having a first end attached to a side surface inside the airbag cushion in the vehicle width direction and a second end attached to an inner surface of the secondary inflating section, and being adapted to inhibit the protruded lobes from swinging around the main inflating section,
 wherein each of the pair of tethers is formed with a single fabric piece, which is folded such that the folded tether has a folded side and an open side.

13. The airbag device of claim 12, wherein the folded tether is provided with an inner layer and an outer layer such that the folded tether is tensioned to form a Y-shape in the inflated condition of the airbag cushion.

14. The airbag device of claim 13, wherein at the second end of the tether, the inner layer is connected to a first boundary between the main inflating section and the secondary inflating section, and the outer layer is connected to a second boundary between the secondary inflating section and the protruded lobe.

15. The airbag device of claim 12, wherein the folded side of the fabric of the tether is provided at the second end of the tether such that a folded surface is formed between an inner layer and an outer layer at the folded side of the tether and is entirely affixed to the inner surface of the secondary inflating section.

16. The airbag device of claim 15, wherein a folded surface width of the tether in the vehicle width direction is generally equal to a width of the secondary inflating section.

17. The airbag device of claim 12, wherein the open side of the fabric of the tether is provided at the second end of the tether such that, at the open side of the tether, each edge surface of an inner layer and an outer layer is formed and affixed to the inner surface of the secondary inflating section.

\* \* \* \* \*